United States Patent
Fritsch et al.

(10) Patent No.: US 6,930,459 B2
(45) Date of Patent: Aug. 16, 2005

(54) METHOD FOR REDUCING THE INFLUENCE OF A DC CURRENT COMPONENT IN THE LOAD CURRENT OF AN ASYNCHRONOUS MOTOR

(75) Inventors: Andreas Fritsch, Kümmersbruck (DE); Gerd Griepentrog, Gutenstetten (DE); Diethard Runggaldier, Stegaurach (DE); Johann Seitz, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/487,216

(22) PCT Filed: Nov. 4, 2002

(86) PCT No.: PCT/DE02/04091

§ 371 (c)(1),
(2), (4) Date: Feb. 19, 2004

(87) PCT Pub. No.: WO03/047086

PCT Pub. Date: Jun. 5, 2003

(65) Prior Publication Data

US 2004/0207352 A1 Oct. 21, 2004

(30) Foreign Application Priority Data

Nov. 15, 2001 (DE) .......................................... 101 56 216

(51) Int. Cl.[7] .............................................. H02K 23/16
(52) U.S. Cl. ...................... 318/437; 318/786; 318/747; 318/801; 318/807; 363/43; 363/37; 363/41; 323/211; 323/239; 323/300
(58) Field of Search .................................. 318/437, 439, 318/801–811, 785, 786, 747, 727; 363/41, 43, 37; 323/211, 239, 300

(56) References Cited

U.S. PATENT DOCUMENTS

| | | | | |
|---|---|---|---|---|
| 3,566,148 A | * | 2/1971 | Peter ............................ | 307/106 |
| 4,162,523 A | * | 7/1979 | Ansorge ........................ | 363/43 |
| 4,730,242 A | * | 3/1988 | Divan .......................... | 363/37 |
| 4,864,483 A | * | 9/1989 | Divan .......................... | 363/37 |
| 5,235,265 A | * | 8/1993 | Chmiel ........................ | 318/786 |
| 5,446,361 A | * | 8/1995 | Van Der Broeck .......... | 318/747 |
| 5,736,825 A | * | 4/1998 | Kaura et al. ................. | 318/599 |
| 5,780,990 A | * | 7/1998 | Weber ......................... | 318/807 |
| 5,986,417 A | * | 11/1999 | Nicolai et al. ............... | 318/245 |
| 5,990,655 A | * | 11/1999 | Escudero ..................... | 318/801 |
| 5,994,883 A | * | 11/1999 | Liu .............................. | 323/237 |
| 6,057,674 A | * | 5/2000 | Bangerter .................... | 323/211 |
| 6,072,260 A | * | 6/2000 | Randall ....................... | 310/216 |
| 6,093,993 A | * | 7/2000 | McClelland ................. | 310/168 |
| 6,104,177 A | * | 8/2000 | Fritsch et al. ................ | 323/300 |
| 6,469,469 B1 | * | 10/2002 | Chambers et al. ........... | 318/801 |
| 6,477,067 B1 | * | 11/2002 | Kerkman et al. ............. | 363/41 |
| 6,756,756 B1 | * | 6/2004 | Chmiel et al. ............... | 318/430 |

FOREIGN PATENT DOCUMENTS

| | | |
|---|---|---|
| DE | 2500911 | 7/1976 |
| DE | 3009445 | 9/1981 |
| DE | 19843106 | 3/2000 |
| DE | 19857695 | 6/2000 |
| WO | WO 98/16004 | 4/1998 |

* cited by examiner

*Primary Examiner*—Paul Ip
(74) *Attorney, Agent, or Firm*—Harness, Dickey & Pierce, P.L.C.

(57) ABSTRACT

A method with which the load current and thus the load moment of an asynchronous motor that is controlled via a phase-controlled two-phase thyristor power controller, can be easily influenced so as to allow a smooth starting operation. According to a first embodiment, the ignition point is determined in the controlled phase in order to adapt the flow angles of the subsequent current half waves. According to a second embodiment, the ignition point of the subsequent current half waves is brought forward in both controlled phases.

30 Claims, 1 Drawing Sheet

METHOD FOR REDUCING THE INFLUENCE OF A DC CURRENT COMPONENT IN THE LOAD CURRENT OF AN ASYNCHRONOUS MOTOR

This application is the national phase under 35 U.S.C. §371 of PCT International Application No. PCT/DE02/04091 which has an International filing date of Nov. 4, 2002, which designated the United States of America and which claims priority on German Patent Application number DE 101 56 216.0 filed Nov. 15, 2001, the entire contents of which are hereby incorporated herein by reference.

FIELD OF THE INVENTION

The present invention is generally directed to a method for reducing the influence of a DC component in the load current of an asynchronous motor.

BACKGROUND OF THE INVENTION

Three-phase controllers use a principle of phase gating to control the amount of energy supplied to an electrical load. This allows the starting currents and torques in asynchronous machines to be reduced. The phase gating angle is used as a measure of the amount of energy supplied. Current half-cycles of alternate polarity flow through the load which is connected to the output of the three-phase controller with there being a time interval during which no current flows and which is determined by the phase gating—also referred to as the delay—between each two successive current half-cycles.

Three-phase controllers are normally equipped with three pairs of thyristors which are connected back-to-back in parallel. However, since the thyristors become the cost-determining factor as the rating of the three-phase controller increases, three-phase controllers having only two pairs of thyristors which are connected back-to-back in parallel are also used. In these so-called two-phase three-phase controllers, the remaining third phase is in the form of a conductor which cannot be switched. A drive such as this is known from DE 30 09 445 A1.

SUMMARY OF THE INVENTION

An embodiment of the invention is based on an object of specifying at least one method by which the load current, and hence the load torque, of an asynchronous motor which is controlled via a two-phase thyristor three-phase controller with phase gating can be influenced with little complexity, for soft starting purposes.

According to an embodiment of the invention, an object is achieved by a first method, and/or by a second method.

An embodiment of the invention is based on the knowledge that, by virtue of their principle of operation, when phase gating takes place in the range of 75°±10° in two-phase three-phase controllers, these controllers have a tendency to produce asymmetric current half-cycles of positive and negative polarity. In consequence, the successive positive and negative current half-cycles which alternate with one another each have a different time duration and amplitude. This leads to a DC component in the load current which, for example in the case of asynchronous machines, produces braking torques and thus makes it harder or completely impossible to start them softly.

Thus the phase-gated load current, which has current half-cycles of alternate polarity and of a different duration and amplitude, and accordingly DC components which produce braking torques, can be influenced such that the DC components are reduced without using measurement devices to determine the current/time integrals which are enclosed by the current half-cycles, thus ensuring that all the effective currents have a uniform rise and profile in order to achieve the desired soft starting.

According to a second method of another embodiment, only current flow information and in general no control loop information is required. Thus, this method can be implemented with a simpler and possibly restricted control device in comparison to the first method. Furthermore, the turn-off times are not recorded, so that it is possible to save software and/or hardware modules.

According to one advantageous development of the first method, it is also advantageously possible, inter alia, to save current transformers for determination of the current flow angles, provided that the respective turn-on and turn-off time can be determined on the basis of a voltage rise across the associated thyristor in the thyristor three-phase controller.

BRIEF DESCRIPTION OF THE DRAWINGS

The various aspects of the invention as well as advantageous refinements according to the features of the dependent claims will be explained in more detail in the following text with reference to exemplary embodiments which are illustrated schematically in the drawing, in which:

DETAILED DESCRIPTION OF THE PREFERRED EMBODIMENTS

Figure 1:
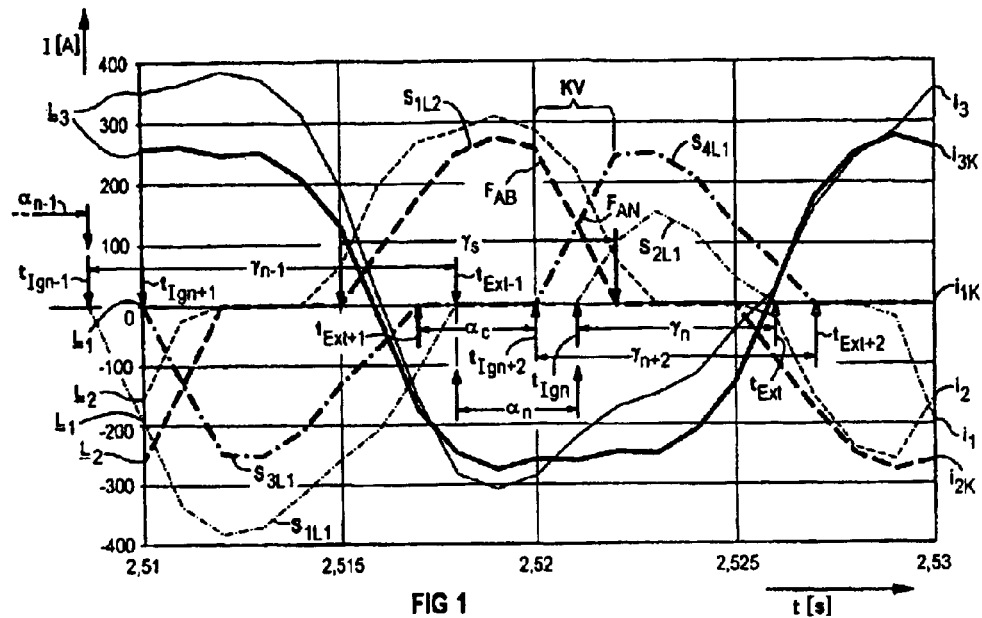
FIG. 1 shows a diagram with three phases of a load current before and after the use of a first method for reducing the influence of a DC component.

FIG. 1 uses a diagram to show the time profile of a three-phase current during starting of an asynchronous machine using a two-phase three-phase controller, before and after the use of a first method for reducing the influence of a DC component. This illustration shows a current $i_1$ and $i_2$ in a first and a second controlled phase $L_1$ and $L_2$, respectively, as well as a current $i_3$ in a third, uncontrolled phase $L_3$, in each case having pronounced DC components.

Furthermore, the currents $i_1$ and $i_2$ have a respectively associated current $i_{1K}$ and $i_{2K}$ corrected according to the method, and the current $i_3$ has an associated current $i_{3K}$, which is influenced by the correction according to the method, all in phase. In order to control the phases $L_1$ to $L_3$, the phase gating is supplied by a function that can be determined via a ramp, in particular a linear ramp.

The first method for reducing the influence of the DC component provides that, first of all, the current flow angle $\gamma_{n-1}$ in a first current half-cycle $S_{1L1}$ is detected in the first controlled phase $L_1$ from its turn-on time $t_{Ign-1}$, and its turn-off time $t_{Ext-1}$. The current flow angle $\gamma_n$ in a subsequent second current half-cycle $S_{2L1}$ is then recorded in the first controlled phase $L_1$ from its turn-on time $t_{Ign}$ and its turn-off time $t_{Ext}$. The respective turn-on and turn-off time is recorded on the basis of a voltage rise across the associated thyristor in the thyristor three-phase controller, and conventional control means can be used for this purpose.

Following this, then, the difference between the current flow angle $\gamma_{n-1}$ in the first current half-cycle $S_{1L1}$ and the current flow angle $\gamma_n$ in the second current half-cycle $S_{2L1}$ is recorded. Finally, the turn-on time $t_{Ign+1}$ in a subsequent, corrected, third current half-cycle $S_{3L1}$ is determined in the first controlled phase $L_1$ on the basis of the recorded difference, in the sense of matching the current flow angles in the current-half cycles.

The turn-on time is determined continuously for subsequent current half-cycles on the basis of the recorded difference between the current flow angles in the respective preceding current half-cycles. This results, inter alia, in the turn-on time $t_{Ign+2}$ for a subsequent, corrected, fourth current half-cycle $S_{4L1}$.

Both the third current half-cycle $S_{3L1}$ which follows the second current half-cycle $S_{2L1}$, together with the associated turn-on and turn-off times $t_{Ign+1}$ and $t_{Ext+1}$, respectively, as well as the fourth current half-cycle $S_{4L1}$ which follows the third current half-cycle $S_{3L1}$, together with the associated turn-on and turn-off times $t_{Ign+2}$ and $t_{Ext+2}$, respectively, for the first controlled phase $L_1$ are superimposed in FIG. 1, in order to illustrate the matching according to the method, with the current flow angles in the first current half-cycle $S_{1L1}$ and the second current half-cycle $S_{2L1}$ in the first controlled phase $L_1$.

In consequence, in a schematic comparison, the corrected turn-on time $t_{Ign+1}$ in the third current half-cycle $S_{3L1}$ occurs, according to the method, later than the original turn-on time $t_{Ign-1}$ in the first current half-cycle $S_{1L1}$ and, according to the method, the corrected turn-on time $t_{Ign+2}$ in the fourth current half-cycle $S_{4L1}$ occurs earlier than the original turn-on time $t_{Ign}$ in the second current half-cycle $S_{2L1}$.

At the same time as the application of the first method, which is related to a single phase, to the first controlled phase $L_1$, this method can also be used without any interactions for the second controlled phase $L_2$, that is to say with the first phase $L_1$ being controlled independently of the second phase $L_2$.

FIG. 1 in this case shows the commutation process KV on the basis of the falling flank $F_{AB}$ in a current half-cycle $S_{1L2}$ in the second controlled phase $L_2$, and on the basis of a rising flank FAN in the fourth current half-cycle $S_{4L1}$ in the first controlled phase $L_1$.

Since the two controlled phases $L_1$ and $L_2$ have current half-cycles $S_{1L2}$ and $S_{4L1}$ with matched respective current flow angles $\gamma_s$ and $\gamma_{n+2}$ as a result of the first method, the current profile of the third, uncontrolled, phase $L_3$ is also advantageously influenced so that this results in all of the effective currents having a uniform rise and profile. In principle, reducing the DC components in a load current also has a positive effect on any inductive measurement device which may be used, since this makes it possible to prevent saturation and thus to take precautions against incorrect measurements.

In contrast to symmetrical polarity driving and turning-on, turn-on times are advanced or delayed continuously by the use of a correction factor C so as to effectively provide compensation for different current flow angles in positive and negative current half-cycles. Symmetrical polarity means that the time period during which no current flows—the delay or phase gating angle α—between two successive current half-cycles of alternate polarity during a transition from a positive current half-cycle to a negative current half-cycle is exactly of the same magnitude as that for a transition from a negative to a positive current half-cycle.

Normally, symmetrical polarity driving and turning-on are associated with symmetrical phase driving and turning-on. Symmetrical phase means that the time period during which no current flows is also of the same magnitude in the sets of thyristor valves—three pairs of thyristors which are connected back-to-back in parallel—in the three phases $L_1$ to $L_3$. Depending on the motor and the load state, the correction factor C may have a value of 0.1 to 0.4, in particular 0.2.

In a corresponding manner, when a thyristor valve set is turned off in the second current half-cycle $S_{2L1}$, the corrected turn-on time $\gamma_{n+1}$ in each subsequent third current half-cycle $S_{3L1}$ is determined using the following equation:

$$t_{Ign+1} = t_{Ext} + \frac{\alpha_C}{360°} * T \tag{1}$$

In this case, $t_{Ext}$ indicates the turn-off time in the current half-cycle which precedes the third current half-cycle $S_{3L1}$, T indicates the period duration, and $\alpha_c$ indicates the corrected phase gating angle. With an alternating current waveform at a frequency of 50 Hz, the period duration T is, for example, 20 ms. The corrected phase gating angle $\alpha_c$ is accordingly determined using the following equation:

$$\alpha_c = \alpha_T \pm C*\Delta\gamma \tag{2}$$

In this case, $\alpha_T$ indicates the averaged phase gating angle, which is determined using the following equation:

$$\alpha_T = \frac{\alpha_n + \alpha_{n-1}}{2} \tag{3}$$

In this case, $\alpha_{n-1}$, indicates the phase gating angle in a first current half-cycle $S_{1L1}$, and $\alpha_n$ indicates the phase gating angle in a second current half-cycle $S_{2L1}$.

Furthermore, C indicates the constant correction factor, which is between 0.1 and 0.4, and is in particular 0.2, and $\Delta\gamma$ indicates the difference between successive current flow angles using the following equation:

$$\Delta\gamma = \gamma_n - \gamma_{n-1} \tag{4}$$

Owing to the alternating polarity between successive current half-cycles, $\Delta\gamma$ always describes the difference between the duration of a positive current half-cycle and a negative current half-cycle.

In this case, $\gamma_{n-1}$ indicates the current flow angle in a first current half-cycle $S_{1L1}$ in accordance with the following equation:

$$\gamma_{n-1} = \frac{t_{Ext-1} - t_{Ign-1}}{T} * 360° \tag{5}$$

In this case, $t_{Ext-1}$ indicates the turn-off time in the current half-cycle $S_{1L1}$ which precedes the second current half-cycle $S_{2L1}$, and $t_{Ign-1}$ indicates the turn-on time in the first current half-cycle $S_{1L1}$ which precedes the second current half-cycle $S_{2L1}$.

Furthermore, $\gamma_n$ indicates the current flow angle in a subsequent second current half-cycle $S_{2L1}$, in accordance with the following equation:

$$\gamma_n = \frac{t_{Ext} - t_{Ign}}{T} * 360° \tag{6}$$

In this case, $t_{Ign}$ indicates the turn-on time in the second current half-cycle $S_{2L1}$ which follows the first current half-cycle $S_{1L1}$.

In order to make it possible to carry out the correction after the next turn-off time, the current flow angle $\gamma_n$ can be stored, in the sense of a further first current half-cycle, for continuous matching, using the following equation:

$$\gamma_{n-1} = \gamma_n \tag{7}$$

Advantageously, only time information and in general no control loop information is required for the first method, with the time information being available in a conventional controller for three-phase controllers in any case, in order to calculate the turn-on times, so that the first method can be implemented with little complexity.

An asynchronous motor which is operated in this manner develops from the start of its drive a torque which increases continuously as the phase gating decreases, so that this asynchronous motor is accelerated to the respective rated rotation speed within a time period of about 2 s to 4 s, for soft starting purposes. Furthermore, in comparison to conventional drives with a two-phase three-phase controller, the effective values of the currents $i_1$ to $i_3$ are reduced by reducing DC components.

An idea of an embodiment of the present invention is to equalize the duration of successive current half-cycles of alternate polarity in one and the same phase, in order to suppress DC components when the phase gating values are in the region of $75°\pm10°$. The correction is generally maintained until the end of the ramp function.

An embodiment of the invention as explained above may be summarized as follows:

In order to make it possible to influence the load current, and accordingly influence the load torque, with little complexity for an asynchronous motor which is controlled by phase gating via a two-phase thyristor three-phase controller, in order to provide soft starting, the first method provides for the turn-on time ($t_{Ign+1}$) in the controlled phases ($L_1$ and $L_2$) to be determined in order to match the current flow angles in the subsequent current half-cycles.

Figure 2:
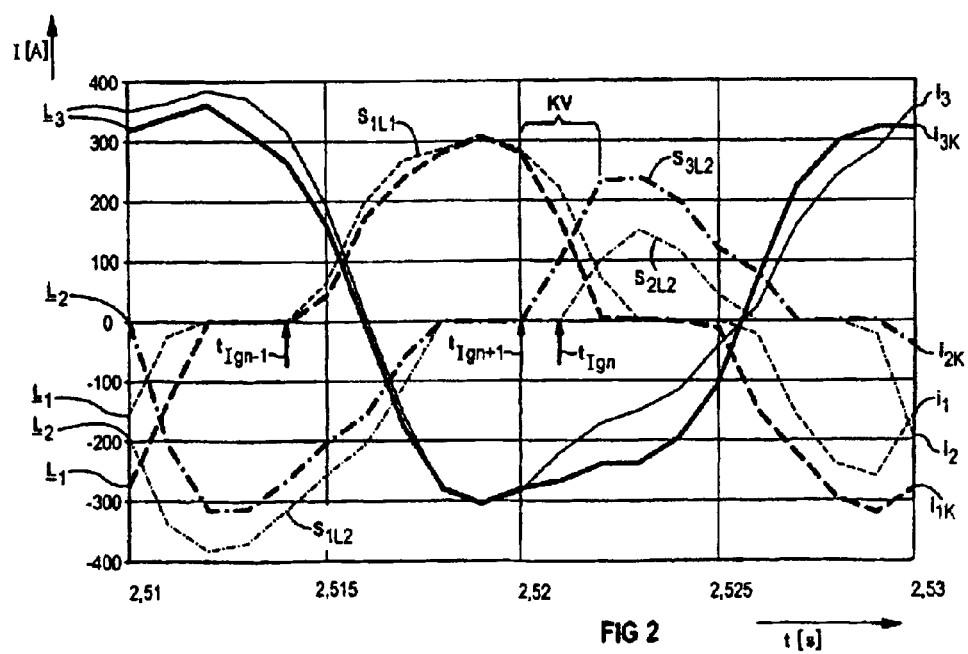
FIG. 2 shows a diagram with three phases of a load current before and after the use of a second method for reducing the influence of a DC component.

FIG. 2 uses a diagram to show the time profile in approximately one period of a three-phase current during starting of an asynchronous machine using a two-phase three-phase controller, before and after the use of a second method for reducing the influence of a DC component. The illustration shows a current $i_1$ and $i_2$ in a first and a second controlled phase $L_1$ and $L_2$, respectively, and a current $i_3$ in a third, uncontrolled, phase $L_3$ in each case with pronounced DC components.

Furthermore, the currents $i_1$ and $i_2$ respectively have an associated current $i_{1K}$ and $i_{2K}$, corrected according to the method, and the current $i_3$ has a current $i_{3K}$, which is influenced by the correction according to the method, all in phase. In order to control the phases $L_1$ to $L_3$, the phase gating is supplied by means of a function which can be determined via a ramp, in particular via a linear ramp.

The second method for reducing the influence of the DC component is based first of all on recording the turn-on time $t_{Ign-1}$ in a first current half-cycle $S_{1L1}$ in a first controlled phase $L_1$. Then, the current flow in the first current half-cycle $S_{1L2}$ in a second controlled phase $L_2$ is recorded at the turn-on time $t_{Ign-1}$ of the first current half-cycle $S_{1L1}$ in the first controlled phase $L_1$. Finally, the turn-on time $t_{Ign}$ in the subsequent second current half-cycle $S_{2L2}$ is advanced in the second controlled phase $L_2$ on the basis of the recorded current flow, to a turn-on time $t_{Ign+1}$ which is subsequent to this, in a third current half-cycle $S_{3L2}$.

FIG. 2 shows the third current half-cycle $S_{3L2}$ superimposed in comparison to the second current half-cycle $S_{2L2}$, in which case, in principle, the third current half-cycle $S_{3L2}$ follows the second current half-cycle $S_{2L2}$. The advancing process is carried out continuously by means of a definable correction factor C, with non-compliance with the condition resulting in no correction during the respective ramp function of the phase gating. Depending on the motor and the load state, the correction factor C may have a value from $-9°$ to $-15°$, in particular $-12°$, so that the second method is accordingly no longer phase symmetrical.

The detection of these so-called trigger times for the correction of the phase gating values and turn-on times is carried out continuously during the ramp function for phase gating, thus resulting in a correction which is independent of time and which is generally maintained until the end of the ramp function.

At the same time as the check of the condition as to whether current is flowing in the second controlled phase $L_2$, the second method, which relates to two phases, can likewise check the condition as to whether current is flowing in the first controlled phase $L_1$, thus allowing them to in each case be driven as a function of one another.

The advancing of the corresponding turn-on time means that a greater commutation current occurs, so that this results in a greater current rise so that the corresponding turn-off time accordingly occurs later so that, in the end, the associated current flow angles are increased or decreased.

By way of example, when carrying out the second method, two input signals, two output signals and a total of four interrupt routines may be used on the control side. The two input signals are current zero-crossing signals. Further, the output signals are thyristor turn-on signals for the two controlled phases $L_1$ and $L_2$. The interrupt routines are in each case triggered by the negative flank—which occurs every 10 ms at a main frequency of 50 Hz—of a current zero-crossing signal. In this case, that particular phase gating is loaded into a so-called timer register, and the timer is started.

When or if the timer overflows, a change is made to the interrupt routine in order there to generate a turn-on pulse for the respective phase by reloading and starting of the timer. According to the method, the signal level of the corresponding input signal to the first controlled phase $L_1$ and second controlled phase $L_2$ is checked throughout the entire ramp function for phase gating to the start of the generation of the turn-on pulse. If current is flowing, a first and/or a second flag is set.

The respective flag is checked before that particular phase gating value is loaded into the timer register. If one or both flags is or are set, the respective phase gating angle is changed by the constant correction factor C before being loaded. If one flag or no flag is set, the respective phase gating angle for the first controlled phase $L_1$ and/or for the second controlled phase $L_2$ is loaded into the timer register without being changed, and conventional control means can be used for this purpose.

An asynchronous motor which is operated in this way generates a torque which increases continuously as the phase gating decreases from the start of the drive, so that it is accelerated to the respective rated speed within a time period of about 2 s to 4 s, for soft starting purposes. Furthermore, in comparison to conventional drives with a two-phase three-phase controller, the effective values of the currents $i_1$ to $i_3$ are reduced by reducing the DC components.

An idea of an embodiment of the present invention is to advance the turn-on times of successive current half-cycles of alternate polarity in two controlled phases as a function of a current flow condition, in order to suppress DC components for phase gating values in the region of $75°\pm10°$.

An embodiment of the invention as explained above can be summarized as follows:

In order to make it possible to influence the load current and accordingly the load torque of an asynchronous motor, which is controlled via a two-phase thyristor three-phase controller with phase gating, with little complexity for soft starting purposes, a second method provides for the turn-on time ($t_{ign}$) in the subsequent current half-cycles to be advanced in two controlled phases ($L_1$ and $L_2$).

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for reducing the influence of a DC component in a load current of an asynchronous motor controlled via a two-phase thyristor three-phase controller with phase gating, comprising:

detecting, in a first controlled phase, a current flow angle in a first current half-cycle, from turn-on time and turn-off time;

recording, in the first controlled phase, a current flow angle in a subsequent second current half-cycle, from turn-on time and turn-off time;

recording a difference between the current flow angle in the first current half-cycle and the current flow angle in the second current half-cycle; and determining, in the first controlled phase, turn-on time in a subsequent third current half-cycle on the basis of the recorded difference, in the sense of matching the current flow angles in the first and second current-half cycles.

2. The method as claimed in claim 1, wherein:

the turn-on time is determined continuously for a subsequent current half-cycle on the basis of the recorded difference between the current flow angles in the respective preceding current half-cycles.

3. The method as claimed in claim 1, wherein the turn-on time is determined using a definable correction factor.

4. The method as claimed in claim 3, wherein the correction factor is in the range of 0.1 to 0.4.

5. The method as claimed in claim 1, wherein the respective turn-on and turn-off time is recorded on the basis of a voltage rise across the associated thyristor in the thyristor three-phase controller.

6. The method as claimed in claim 1, wherein the turn-on time ($t_{Ign+1}$) in a respective subsequent third current half-cycle ($S_{3L1}$) is determined using:

$$t_{Ign-1} = t_{Ext} + \frac{\alpha_C}{360°} * T$$

where:

$t_{Ext}$=the turn-off time in the current half-cycle which precedes the third current half-cycle, T=the period duration $\alpha_c$=the corrected phase gating angle where:

$$\alpha_c = \alpha_T \pm C * \Delta\gamma$$

where $\alpha_T$=the averaged phase gating angle $$\alpha_T = \frac{\alpha_n + \alpha_{n-1}}{2}$$

where:

$\alpha_{n-1}$=the phase gating angle in a first current half-cycle $\alpha_n$=the phase gating angle in a second current half-cycle C=the correction factor (0.1 to 0.4, in particular 0.2)

$\Delta\gamma$=the difference between successive current flow angles where:

$$\Delta\gamma = \gamma_n - \gamma_{n-1}$$

where:

$\gamma_{n-1}$=the current flow angle in a first current half-cycle where:

$$\gamma_{n-1} = \frac{t_{Ext-1} - t_{Ign-1}}{T} * 360°$$

where:

$t_{Ext-1}$=the turn-off time in the current half-cycle which precedes the second current half-cycle, $t_{Ign-}$=the turn-on time in the current half-cycle which precedes the second current half-cycle, where:

$\gamma_n$=the current flow angle in a subsequent second current half-cycle, where:

$$\gamma_n = \frac{t_{Ext} - t_{Ign}}{T} * 360°$$

and the current flow angle in a further first current half-cycle for continuous matching where:

$$\gamma_{n-1} = \gamma_n$$

where:

$t_{Ign}$=the turn-on time in the current half-cycle which follows the first current half-cycle.

7. The method as claimed in claim 1, wherein the method is for at least one of the first and the second phase in the respective mutually independent drive.

8. The method as claimed in claim 1, wherein the phases are driven in the form of ramps, for soft starting of the asynchronous motor.

9. A method for reducing the influence of a DC component in a load current of an asynchronous motor controlled via a two-phase thyristor three-phase controller with phase gating, comprising:

recording a turn-on time in a first current half-cycle in a first controlled phase;

recording the current flow in the first current half-cycle in a second controlled phase, at the turn-on time of the first current half-cycle in the first controlled phase; and advancing the turn-on time in the subsequent second current half-cycle in the second controlled phase on the basis of the recorded current flow.

10. The method as claimed in claim 9, wherein the turn-on time is determined continuously for a subsequent current half-cycle using a definable correction factor.

11. The method as claimed in claim 10, wherein the correction factor is in the range −9° to −15°.

12. The method as claimed in claim 9, wherein the method is for at least one of the first and second phase in the respective mutually independent drive.

13. The method as claimed in claim 9, wherein the phases are driven in the form of ramps, for soft starting of the asynchronous motor.

14. The method as claimed in claim 2, wherein the turn-on time is determined using a definable correction factor.

15. The method as claimed in claim 14, wherein the correction factor is in the range of 0.1 to 0.4.

16. The method as claimed in claim 3, wherein the correction factor is 0.2.

17. The method as claimed in claim 14, wherein the correction factor is 0.2.

18. The method as claimed in claim 2, wherein the respective turn-on and turn-off time is recorded on the basis of a voltage rise across the associated thyristor in the thyristor three-phase controller.

19. The method as claimed in claim 2, wherein the method is for at least one of the first and the second phase in the respective mutually independent drive.

20. The method as claimed in claim 2, wherein the phases are driven in the form of ramps, for soft starting of the asynchronous motor.

21. A method for reducing the influence of a DC component in a load current of an asynchronous motor, comprising:
 detecting a current flow angle in a first current half-cycle from turn-on time and turn-off time;
 recording a current flow angle in a subsequent second current half-cycle from turn-on time and turn-off time;
 recording a difference between the current flow angle in the first current half-cycle and the current flow angle in the second current half-cycle; and
 determining turn-on time in a subsequent third current half-cycle by matching the current flow angles in the first and second current-half cycles using the recorded difference.

22. The method as claimed in claim 21, wherein the turn-on time is determined continuously for a subsequent current half-cycle on the basis of the recorded difference between the current flow angles in the respective preceding current half-cycles.

23. The method as claimed in claim 21, wherein the turn-on time is determined using a definable correction factor.

24. A method for reducing the influence of a DC component in a load current of an asynchronous motor, comprising:
 recording a turn-on time in a first current half-cycle in a first controlled phase;
 recording the current flow in the first current half-cycle in a second controlled phase, at the turn-on time of the first current half-cycle in the first controlled phase; and
 advancing the turn-on time in the subsequent second current half-cycle in the second controlled phase on the basis of the recorded current flow.

25. The method as claimed in claim 24, wherein the turn-on time is determined continuously for a subsequent current half-cycle using a definable correction factor.

26. An apparatus for reducing the influence of a DC component in a load current of an asynchronous motor, comprising:
 means for detecting a current flow angle in a first current half-cycle from turn-on time and turn-off time;
 means for recording a current flow angle in a subsequent second current half-cycle from turn-on time and turn-off time and for recording a difference between the current flow angle in the first current half-cycle and the current flow angle in the second current half-cycle; and
 means for determining turn-on time in a subsequent third current half-cycle by matching the current flow angles in the first and second current-half cycles using the recorded difference.

27. The apparatus as claimed in claim 26, wherein the turn-on time is determined continuously for a subsequent current half-cycle on the basis of the recorded difference between the current flow angles in the respective preceding current half-cycles.

28. The apparatus as claimed in claim 26, wherein the turn-on time is determined using a definable correction factor.

29. An apparatus for reducing the influence of a DC component in a load current of an asynchronous motor, comprising:
 means for recording a turn-on time in a first current half-cycle in a first controlled phase and for
 recording the current flow in the first current half-cycle in a second controlled phase, at the turn-on time of the first current half-cycle in the first controlled phase; and
 means for advancing the turn-on time in the subsequent second current half-cycle in the second controlled phase on the basis of the recorded current flow.

30. The apparatus as claimed in claim 29, wherein the turn-on time is determined continuously for a subsequent current half-cycle using a definable correction factor.

* * * * *